3,475,578
SYSTEM OF PROGRAM CONTROL OF FEEDS DRIVE IN ELECTROEROSION GOUGING MACHINES
Vladimir Sergeevich Vasiliev, Novye Cheremushki, kvartal 26/6, korpus; Vladimir Grigorievich Zusman, 5 Verkhne Mikhailovsky proezd 28, kv. 7; Valery Arkadievich Ratmirov, Ulitsa Alexeya Tolstogo 26, kv. 15; and Melib Samuilovich Agursky, Prospekt Kalinina 18/9, kv. 7; all of Moscow, U.S.S.R.
Filed July 20, 1967, Ser. No. 654,930
Int. Cl. B23k 9/16; G11b 13/00; G06f 15/46
U.S. Cl. 219—69
1 Claim

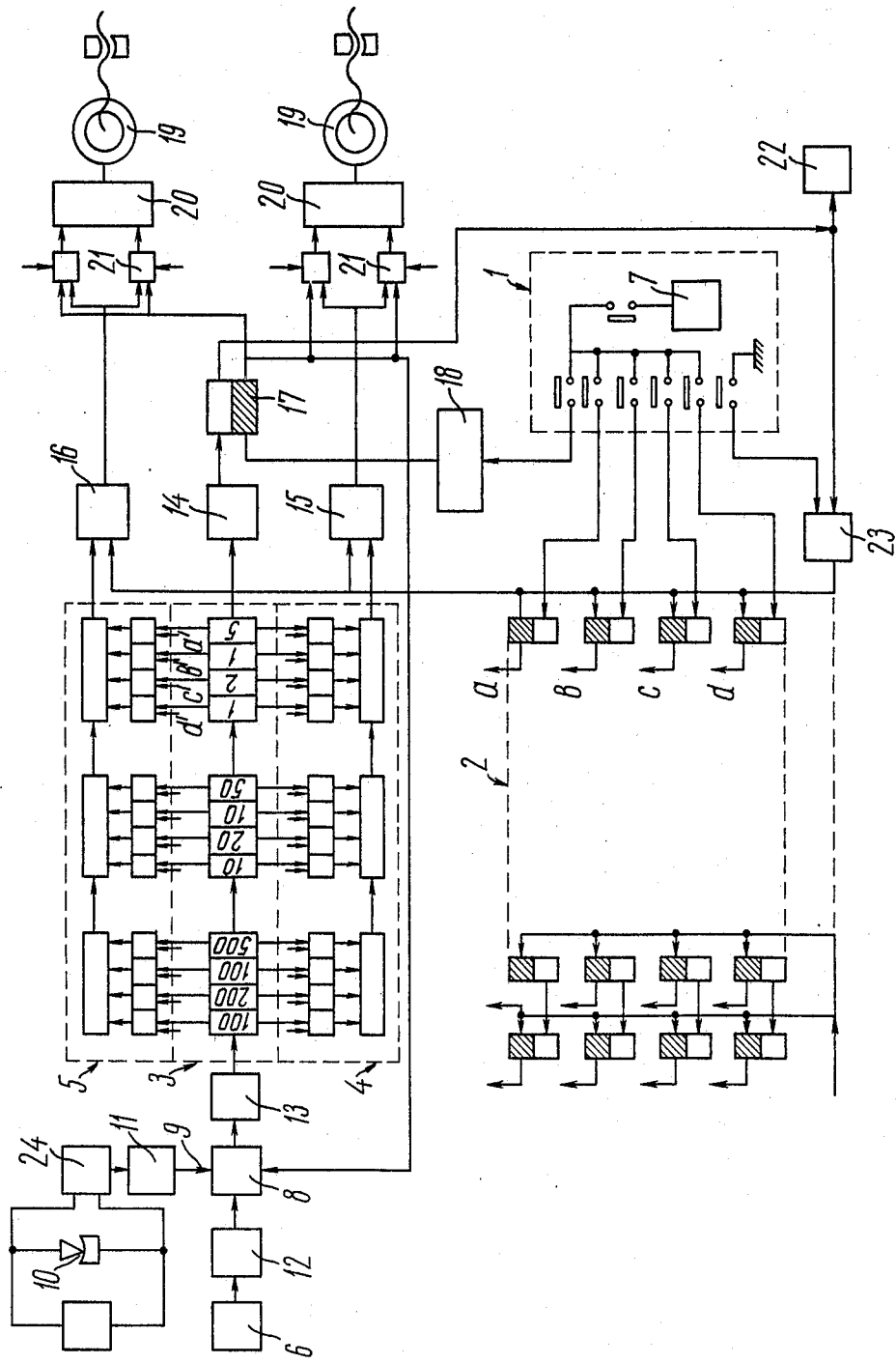

ABSTRACT OF THE DISCLOSURE

A system of program control of the feeds drive in electroerosion goughing machines with a serial introduction of the program into the electronic memory unit of a code converter whose master oscillator is connected to converted decades via an in-gate opened by a control flip-flop provided at the code converter output. The multiplier in-gate has an additional input connected to the spark-erosion gap via a means for stepwise variation of the potential at a preset value of voltage across the erosion gap, while connected to the other input and output of the gate are pulse shapers, the pulse duration of the shaper at the output being greater than the pulse duration of the shaper at the input. This ensures relay self-setting according to the electroerosion process parameters.

---

The present invention relates to devices for digital program control of machines and, more particularly, to devices for program control of electroerosion machines with a non-profiled electrode.

Known in the art are devices for digital program control, which comprise a code converter with a serial of the program into the electronic memory unit of said code converter, whose master oscillator is connected via an in-gate opened by a control flip-flop provided at the code converter output (cf. "System with Step Motors" by V. A. Ratmirov et al., p. 27 "Energia" Publishers, 1964).

A disadvantage of the prior art devices is that control instructions are sent according to the digital program irrespective of the course of the electroerosion process in the machine. Therefore, short circuits that may occur within the spark-erosion gap during the machining process lead to the rupture of the wire electrode and to the shutdown of the machine.

The occurrence of short circuits also results in a poor surface finish. The specific nature of the electro-erosion process does not allow the preprogramming of such a feed value which would ensure maximum efficiency and preclude the rupture of the wire electrode.

Determination of the feed value ensuring the required efficiency and the machining accuracy is still more difficult in case of varying thickness of a workpiece within the working zone. When machining workpieces of a complicated profile, the withdrawal of the electrode from the short-circuited area requires the memorization of the traversed trajectory and of the length of the path traversed in reverse. This makes the program control system extremely complicated and, naturally, less reliable.

It is an object of the present invention to provide a device for digital program control of electro-erosion gouging machines, which would ensure a high machining efficiency without any rupture of the wire electrode and with a good surface finish.

Other objects and advantages of the present invention will become apparent hereinbelow when considering the description of an exemplary embodiment thereof and the appended drawing showing the electric circuit diagram of the device for digital program control of electroerosion gouging machines, according to the invention.

The system of digital program control of electroerosion machines comprises a code converter and a step feeds drive.

The code converter consists of a reader 1 adapted to introduce the program (FIG. 1), an electronic memory unit 2 employing flip-flops with separate inputs, a multiplier 3 with selection units 4 and 5 operated by the memory via channels $a \div a^1$, $b \div b^1$, $c \div c^1$, . . . . The code converter has a master oscillator 6 and an input generator 7. The in-gate 8 has an additional input 9 connected to an erosion gap 10 via a shaper 11 of stepwise variation of the potential. Provided between the in-gate 8 and the master oscillator 6 is a pulse shaper 12, said in-gate 8 being connected to the decades of the multiplier 3 via a shaper 13.

Provided in the output selection circuits of the multiplier 3 are electronic average units 14, 15, and 16. The control of the beginning and end of the punched tape frame is effected by a control flip-flop 17 having separate inputs. One of the inputs of said flip-flop 17 is connected to the reader 1 via a control unit 18, while the other input is connected to the output of the average unit 14.

The feeds drive is effected by step motors 19 operated by electronic commutators 20 via reverse units 21. The device has a relay unit 22 for triggering and stopping the reader 1. Setting pulses arrive to the memory through a gate 23.

Voltage from the spark-erosion gap 10 is picked up by means of a measuring circuit 24 and a shaper 25 made as a Schmidt flip-flop.

The device operates as follows.

Once the circuit is enabled, the program is introduced in the reader 1, which sets the value of travel or movement for each of the coordinates. The initial frame of the program contains no information for movement or travel. It is introduced by resetting the control flip-flop 17. When this frame is introduced, the setting pulses bring the flip-flops $a$, $b$, $c$, . . . of the memory unit 2 to the initial state. The in-gate 8 at the input of the decades of the multiplier 3 is open, and pulses of the master oscillator 6 pass through the decades, setting the decade flip-flops to the initial state. Pulses do not pass through the output of the code converter, as the gates of the selection units 4 and 5 are blocked by the flip-flops of the memory unit 2 (inputs $a^1$, $b^1$, $c^1$, . . . ). The decade flip-flops are connected according to a circuit, ensuring selection of the pulses in the code 5, 1, 2, 1. Once the decades of the multiplier 3 and the average unit 14 are overflown, the control flip-flop 17 gets reset. As a result, the in-gate 8 of the decades and the gate 23 of the setting pulses are blocked, and a signal to introduce the next frame is issued via the relay unit 22. When the frame is being introduced, there is no motion along the coordinates. The frame having been introduced, some of thte flip-flops of the memory unit 2 gets reset in compliance with holes punched in the given frame. The pulse fed from the reader 1 to the code input of the register will make a record "1" in the first digit. Recording of the information in the digit of the memory unit 2 is effected in series, and flip-flops constituting any of the lines have a common input. Initially, all the registers are set for "0." To obtain the record of "1," one code pulse is fed to the input of the first digit of the first flip-flop. As soon as another setting pulse is fed, the first line flip-flop returns to position "0," and the "1" passes over to another line. Owing to the provision of a delay line between the flip-flops the pulse passes over to this other line some time after the elapse of the setting pulse.

At the end of the frame a signal is issued for resetting the control flip-flop 17. Concurrently, the control unit 18 exercises the even parity check of the correctness of the information read from the punched tape. If the reading is correct, a signal for resetting the control flip-flop 17 is issued. The in-gate 8 opens and the instructions contained in the frame introduced in the memory unit are performed. The number of pulses selected from the decades of the multiplier 3 during their overflow time is determined by the selection units 4 and 5 opened by the memory flip-flops. The selected pulses are fed to the reverse unit 21 via the average units 15 and 16. Depending upon which of the gates of the reverse unit 21 is opened by the memory flip-flops, the pulses are fed to one of the two inputs of the electronic commutator 20 transforming a one-channel pulse train into an m-phase variation of voltages. Connected to the electronic commutator 20 are step motors 19 of the feeds drive.

When the voltage between the wire electrode and a workpiece drops to a certain value, the shaper 11 operates, closing the in-gate 8. The motion of the step motor 19 of the feeds drive along the coordinates is discontinued. The electroerosion process taking place between the electrode and the workpiece results in depletion of metal and brings about an increase in the voltage across the spark-erosion gap, which fact leads to opening the in-gate 8 and to the continuation of the motion along the coordinates. The pulses fed by the master oscillator 6 may coincide with the moment of stepwise variation of the potential at the shaper 11. To prevent an occasional malfunction of the decades the shaper 13 is provided at the output of the ingate 8, said shaper 13 having a longer duration of pulse than that of the shaper 12 provided at the input of the same in-gate. The value of the operation threshold of the shaper 11 which is essentially a Schmitt flip-flop is set by the measuring circuit 24 which is made adjustable for the purpose. The parameters of this measuring circuit are varied depending upon the properties of the machined metal, thickness of the workpiece and other technological characteristics.

The frequency of the master oscillator 6 is also preset depending upon the type of machining, said master oscillator being made adjustable. The system of self-setting of the cutting mode may be employed in other systems of program control, for instance, in case of a code converter designed to effect circular interpolation.

Although the present invention has been described with reference to the preferred embodiment thereof, various alterations and modifications can be made without departing from thte spirit and scope of the invention, as those skilled in the art may easily understand.

These alterations and modifications are to be considered as falling within the essence and scope of the invention, as specified in the appended claim.

What we claim is:

1. A system of program control of the feeds drive in machines, predominantly, electroerosion gouging machines, which comprises: a reader to introduce the program; a memory unit connected with said reader; a multiplier connected to said memory unit; a master oscillator for setting pulses connected with said multiplier; a control flip-flop connected to the multiplier output; a means for stepwise variation of the potential at a preset value of voltage across the erosion gap; an in-gate connected by its inputs to said master oscillator, control flip-flop and means for stepwise variation of the potential and by its output to said multiplier; a first pulse shaper inserted between said master oscillator for setting pulses and said in-gate; a second pulse shaped connected by its input to the output of said in-gate and by its output to said multiplier; and an operating motor for the machine feeds drive, which is connected with said control flip-flop.

References Cited

UNITED STATES PATENTS

| 2,922,940 | 1/1960 | Mergler | 318—18 |
| 3,086,154 | 4/1963 | Lowther et al. | 235—151.11 X |
| 3,099,777 | 7/1963 | Davis | 235—151.11 X |
| 3,288,693 | 11/1966 | Livshits. | |

JOSEPH V. TRUHE, Primary Examiner

R. F. STAUBLY, Assistant Examiner

U.S. Cl. X.R.

235—61.6, 151.11; 318—18; 340—172.5